Oct. 18, 1966
A. STROM
3,279,830
WOOD FASTENER
Original Filed April 17, 1962
3 Sheets-Sheet 1
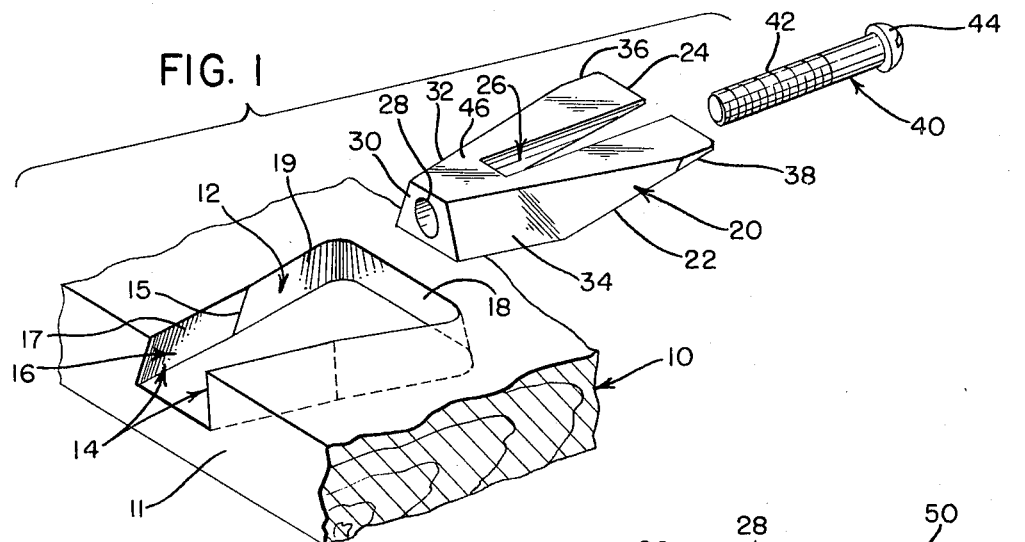
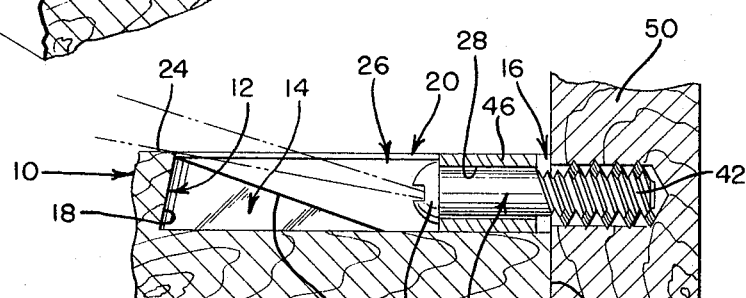
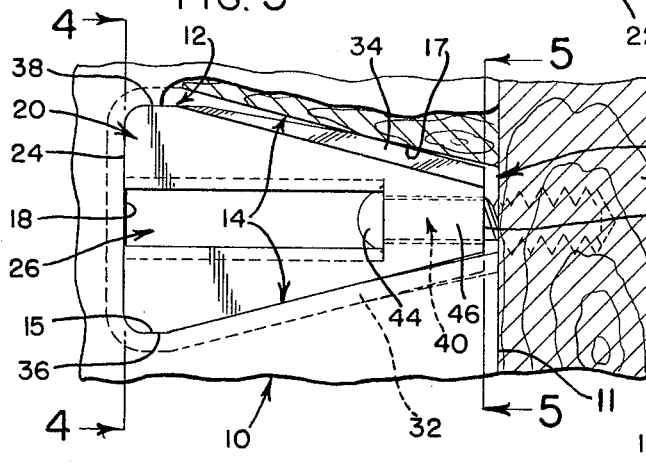
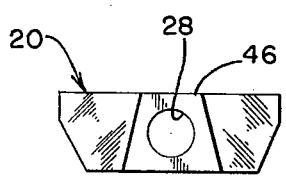
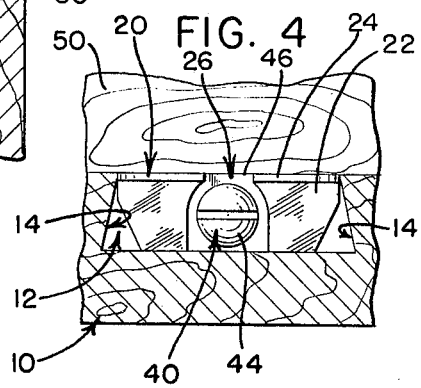
INVENTOR.
ALBERT STROM
BY  *Fay & Fay*
ATTORNEYS

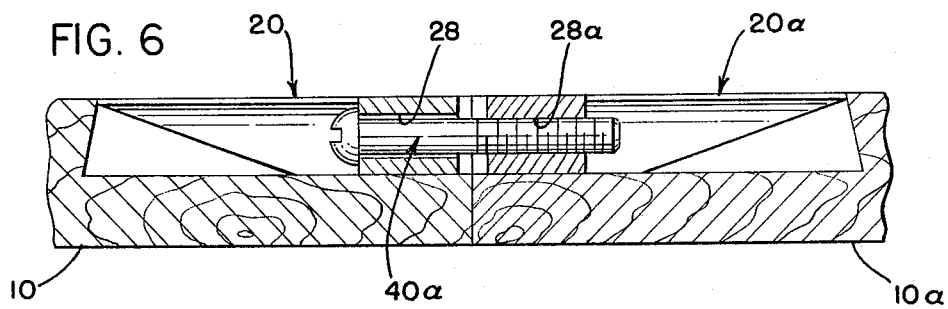
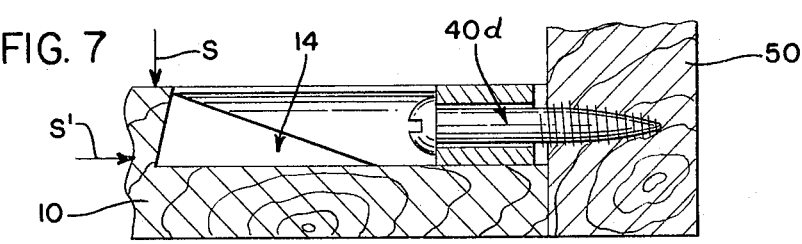
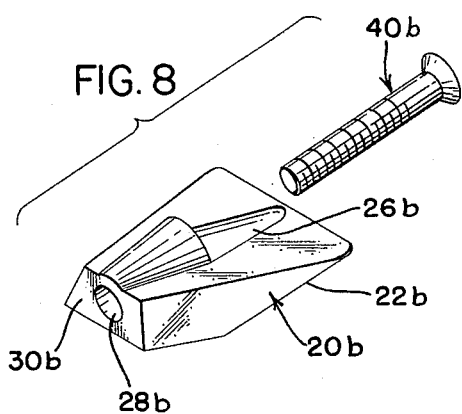
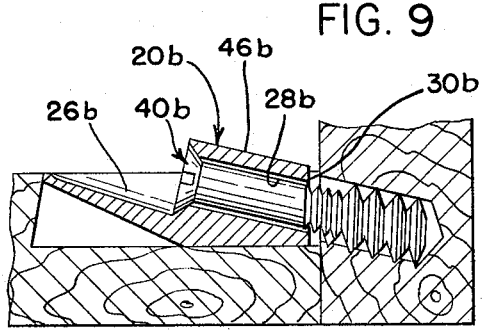
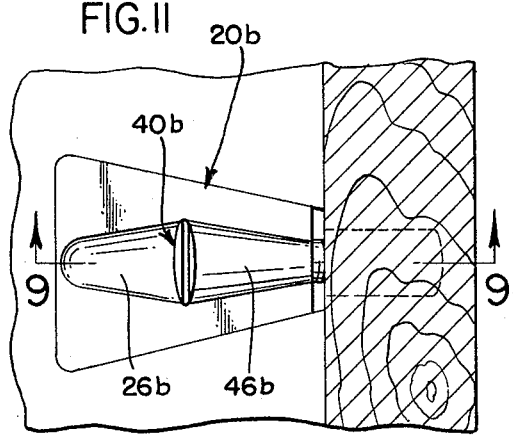
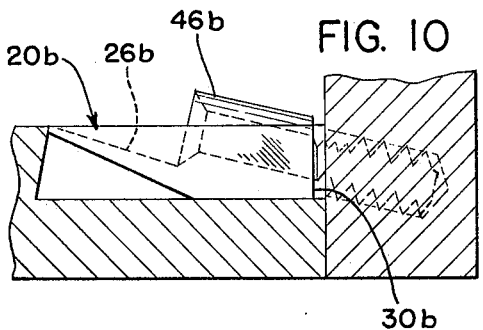

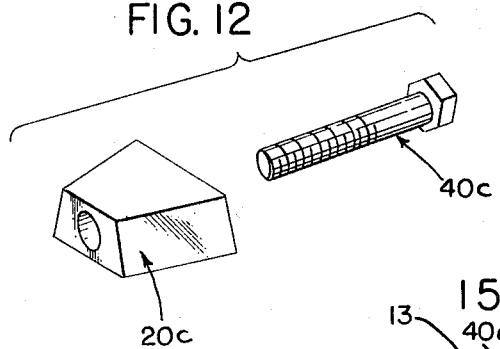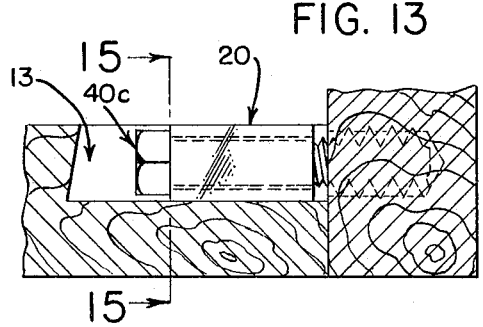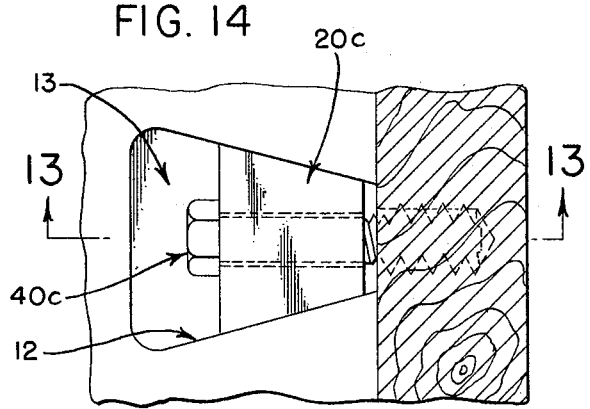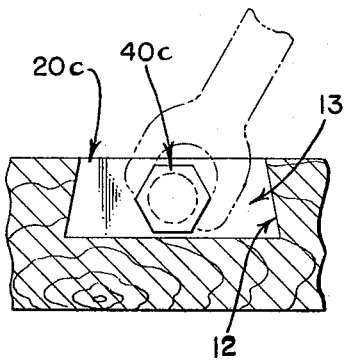

United States Patent Office 3,279,830
Patented Oct. 18, 1966

1

3,279,830
WOOD FASTENER
Albert Strom, Upper Montclair, N.J., assignor to Ibex
Development Co., Cleveland, Ohio, a corporation of
Ohio
Continuation of abandoned application Ser. No. 188,169,
Apr. 17, 1962. This application Apr. 5, 1965, Ser. No.
449,359
1 Claim. (Cl. 287—20.92)

This invention is a continuation of the U.S. patent application of Albert Strom entitled Wood Fastener, Ser. No. 188,169, now abandoned, which was filed in the Patent Office on April 17, 1962.

The invention relates to a wood fastener and is directed particularly to a fastener body member adapted for attachment at the junction of two wooden members in a dovetailed mortise and tenon type of joint. This fastener body member is characterized by being of a generally truncated triangular shape with a central bore and a beveled trapezoidal cross section, the bevel being on one side of the body at the base edge of the truncated triangle to permit insertion of the body in a complementarily shaped dovetailed rabbet or mortise adjacent an edge of a first one of said wooden members to permit securement of said body to the second one of said wooden members by means of a threaded fastener extending through said bore and into said second wooden member to provide thereby a dovetailed tenon attached to said second member by means of said fastener and firmly seated in said rabbet to form a dovetailed mortise and tenon type of joint.

The invention is characterized further as being a wood fastener adapted for engagement with a dovetailed rabbet in a first of two wooden members possibly in the horizontal plane and on the underside of a shelf or the like, and is adapted generally for field placement to effect a holding force between said first wooden member and the second wooden member; the second wooden member generally being perpendicular to said first wooden member with the tenon type attachment secured thereon by means of a screw or the like and such co-operative holding devices as, for example, special fasteners of the threaded "Heli-coil" or expanded plug type for improved gripping power into the second member. The second member also may be of plaster or drywall construction material in the form of a wall or the like.

The invention generally is of a machined or cast construction capable of withstanding the forces to be exerted upon the joined members during service and conveniently may be of brass or other suitable metal.

The word "mortise," used in this application, is defined as a notch, hole, or space cut in a piece of wood or other material to receive a corresponding projecting piece called a tenon, formed on another piece of wood, etc., in order to fix the two together at a given angle.

It is an object of this invention to provide a new and improved fastener for connecting wooden members together, said fastener having a body of a generally truncated triangular shape with a central bore and a beveled trapezoidal cross section.

It is a further object of this invention to provide a new and improved fastener body member adapted for attachment at the junction of two wooden members to form a dovetailed mortise and tenon joint.

It is a further object of this invention to produce a new and improved outwardly flaring dovetailed fastener body for easy insertion in an inwardly flaring dovetailed rabbet or mortise of a first wooden member for ready and rapid attachment by means of a screw fastener through said body to a second wooden member as a tenon on said second member for co-operation with the rabbet in

2 said first member in forming a mortise and tenon joint between the wood members.

It is a further object of this invention to provide a tenon type fastener body member of generally truncated triangular shape with a central bore and a beveled trapezoidal cross section, the bevel being on one side of the body at the base edge of the truncated triangle to permit insertion of the body in a complementarily shaped dovetailed rabbet or mortise adjacent the edge of a first wooden member and thereby to permit securement of said body to a second wooden member by means of a threaded fastener extending through said bore and into said second wooden member to provide thereby a dovetailed tenon attached to said second member by means of said fastener and firmly seated in said rabbet to form a dovetailed mortise and tenon type of joint.

It is a further object of the invention to provide a mortise and tenon type of joint which distributes stresses in a lateral direction spaced from the edge of the joined members, thereby to prevent weakening of the joint by forces of tension exerted thereon.

To the accomplishment of the foregoing and related ends, said invention, then, consists of the means hereinafter fully described and particularly pointed out in the claim; the following description setting forth in detail, approved means of carrying out the invention, such disclosed means, however, constituting but some of the various ways in which the principles of the invention may be used.

In the drawings:

FIG. 1 is an exploded view in perspective of a rabbeted wooden member, a wood fastener body, and a threaded fastener according to the principles of this invention;

FIG. 2 is a sectional view of a mortise and tenon type of joint formed using the wood fastener of the invention;

FIG. 3 is a plan view of the joint of FIG. 2 with parts broken away;

FIG. 4 is a cross-sectional view taken along the line 4—4 of FIG. 3;

FIG. 5 is a detached elevation cross-sectional view taken along the line 5—5 of FIG. 3;

FIG. 6 is an illustration of a modified type of joint utilizing two of the fastener bodies of the invention for a secured butt joint between two flush wooden members;

FIG. 7 illustrates a fastener body according to the principles of this invention, utilizing a conventional type of threaded wood fastener means;

FIG. 8 is an exploded perspective view of a further modification of the fastener body of the invention;

FIG. 9 is a cross-sectional elevational view taken along the line 9—9 of FIG. 11, illustrating a mortise and tenon joint, utilizing the fastener body embodiment shown in FIG. 8;

FIG. 10 is a view similar to FIG. 9 with the fastener shown in elevation;

FIG. 11 is a plan view of a joint utilizing the fastener of FIG. 8;

FIG. 12 is an exploded perspective view of a different embodiment of the wood fastener constructed according to the principles of this invention;

FIG. 13 is a cross-sectional elevational view taken along the line 13—13 of FIG. 14, illustrating a joint constructed using the wood fastener of the embodiment of FIG. 12;

FIG. 14 is a plan view of the joint of FIG. 13;

FIG. 15 is a view along the line 15—15 of FIG. 13 with the tool shown in phantom to illustrate the method of assembly of the joint.

In the several views of the drawings, like numerals are used to designate like parts throughout.

In the embodiment illustrated in FIGS. 1–5, a wooden member 10 having perpendicular surfaces is to be provided as the mortise member of a mortise and tenon joint. The mortise 12 is a routed or otherwise provided rabbet having dovetailed sides 14 defining its peripheral shape and in open communication with the perpendicular edge 11 of the member 10, in opening 16. As shown, the rabbet or mortise 12 is of a generally truncated triangular shape over-all having a base surface 18 opposite the opening 16. The dovetailed sides 14 have a broken taper as shown at 15 in FIG. 1, for instance, which divides said dovetailed sides into an outer portion 17 and an inner portion 19. The inner portion 19 has a taper complementary to the taper of a fastener body 20, and the outer portion 17 has a slightly different taper to minimize its initial contact with the fastener body 20 to distribute stresses thereby in a manner to be explained hereinafter.

The fastener body 20, according to the principles of this invention, is generally a truncated, triangular block of trapezoidal cross-section having a beveled lower edge 22 adjacent the base 24 of the truncated triangle and a central slot 26 perpendicular to said base at the midpoint thereof, which ends in a cylindrical bore 28 opening through to the truncated plane 30. The truncated, triangular shape of the fastener body is generally complementary to the shape of the rabbet or mortise 12, such that the body may be inserted in the mortise to act as a tenon therewith.

The trapezoidal shape of the cross section of the body provides the dovetailed surfaces 32 and 34 for co-operation with the dovetailed surface 14, particularly at the inner portions 19 thereof, of the rabbet 12. The bevel 22 on the fastener body is provided, of course, so that the fastener body 20 may be inserted into the rabbet in a path along the longitudinal plane of symmetry thereof. The corners of the body 20 preferably are beveled as at 36 and 38 to provide for easy clearance upon insertion into the rabbet 12. A threaded fastener 40 of conventional design either of the "Heli-coil" type as illustrated in FIGS. 2, 4, or of the conventional wood fastener type as illustrated in FIG. 7, is provided for insertion into the bore 28 of the tenon body 20 and these parts are relatively dimensioned to permit this insertion.

As shown in FIG. 2, the member 10 is placed flush against a similar wooden member 50 to which it is to be joined and a tool, as shown in phantom in FIG. 2, such as a screw driver, is used to threadedly engage the wooden member 50 and draw it up tight against the member 10 under the tension exerted between the threads 42 and the head 44 of the fastener 40 acting on the bored portion 46 of the fastener body 20 therebetween.

It should be noted that upon insertion of the body 20 into the rabbet 12, the breaks in the taper as shown at 15, provide for increasing clearance between the sides 32 and 34 of the body 20 and the outer side portions 17 as they progress toward the opening 16 in the surface 11. Thus, initially, the body 20 is only in contact with the inner portions 19 of the sides 14 of the rabbet 12. Moreover, the taper of the side portions 19 is provided such that initially, at least, the truncated plane 30 of the body 20 is spaced from the opening 16 in the surface 11 by a small amount, for example 3/32 of an inch, so that when a screw driver or other tool, as shown in phantom in FIG. 2, is used to tighten the threaded fastener in the bore 28 of the body 20 into threaded engagement with the member 50, the tension created between the threads 42 and the head 44 of the fastener 40, draws the member 50 up against the surface 11 of the member 10, and thereby causes the body 20 to engage tightly the portions 19 of the rabbet 12, thereby to distribute stresses laterally of the sides 14. This stress distribution results from a wedging of the sides of the body into the tapered portions 19 and occurs most prominently just inward of the lines 15 separating the tapered portions 17 from portions 19. As the threaded fastener is tightened by clockwise turning, the body 20 advances toward the opening 16 in the surface 11 and places the portions 19 under compression which, if carried to the limit, will change the taper of the portions 19 to coincide more nearly with the taper of the portion 17, thus enabling the body 20 to seat firmly in dovetailed and wedged engagement with the sides 14 of the rabbet with the principal areas of stress being somewhat removed from the edge 11 of the wooden member 10, thereby to maximize the strength of the joint and firmly abut the members in proper position.

As will be obvious to one skilled in the art and from an understanding of these principles, the differential provided by the tapered portions 17 and 19 can be provided in other analogous ways, such as by curving the sides 14 of the rabbet 12 or providing the sides 32 and 34 of the body with portions having different tapers, or with curved contours, or by combining these features in an appropriate manner to insure that the principal areas of stress are somewhat removed from the edge 11 of the wooden member 10 in the manner explained.

In the embodiment shown in FIG. 6, it will be seen that two rabbeted wooden members 10 and 10a and two fastener bodies 20 and 20a, respectively, may be used in abutting relationship with their respective bores 28 and 28a in alignment, such that a single fastener means, such as a round headed bolt 40a, may be used either in association with threads in the bore 28a of the body 20a (not shown) or with a nut on the end of the bolt 40a (not shown), to draw the rabbeted wooden members into tight abutting relationship and thereby to provide a flush joint between the adjacently joined members.

FIG. 7 illustrates the joint of FIG. 2 in which a conventional threaded wood fastener or screw 40d is used rather than the threaded "Heli-coil" type of fastener 40 of FIG. 2. The advantage of the fastener 40d, of course, lies in the fact that no hole or other provision of the "Heli-coil" need be provided in advance of assembly in the member 50.

FIGS. 8–11 illustrate an embodiment 20b of the fastener body 20 in which a raised portion 46b extending rearwardly of a truncated surface 30b is provided with a bore 28b extending at an angle to the truncated surface 30b. A slot 26b in the fastener body member 20b extends through but a portion of the thickness thereof but does not extend to the beveled portion 22b. This provision permits the threaded fastener member 40b to be turned more easily by means of a screw driver or other conventional tool to tighten the joint.

In FIG. 12 a further embodiment 20c of the fastener body 20 is illustrated in which the length of the tenon-type body fastener is substantially less than the length of the rabbet or mortise 12 of the joint, thus providing clearance in the area 13 of the rabbet 12 for the insertion of a conventional tool, such as a wrench, to turn a hex-headed threaded fastening means or bolt 40c, which may or may not be of the "Heli-coil" type as illustrated. The use of this particular embodiment is well adapted for assembly of a plurality of parallel members, such as shelves of a bookcase, particularly in close quarters where use of a screw driver would be extremely inconvenient due to its longitudinal dimensions.

It will be noticed that in all cases, the fastener body, upon being threadedly associated with the wooden member to be joined to the rabbeted member, forms a tenon on said member for association with the rabbet or mortise. It will be noted further that in the various embodiments, the tenon is dovetailed to provide an interlock with the complementary dovetail shape of the sides of the mortised member. It is apparent, also, from the drawings and the above description that the rabbet or mortise flares inwardly away from the edge of the wooden member 10 and that the tenon body flares outwardly away from the edges of the wood member 50. It is this complementary flaring which provides for the resistance to tension forces tending to separate the joined members, and it is the dovetailed interlock of the mortise and tenon-type fastener body which provides for the resistance to shearant forces tending to separate the joined members.

A careful study of the geometry and forces on the fastener body will indicate clearly that there will be very good resistance to shear forces in this fastener member in that loads parallel to the edge 11 of the member 10 will be resisted by the angled or dovetailed surfaces of the fastener body. Note how a vertical force S on the member 10, as indicated by the arrow in FIG. 7, for example, would be resisted by the general holding force between the members through the threaded fastener since any force upon the wooden member 10 would be transmitted through the wooden member 10 and dovetailed surfaces 14 to the dovetailed surfaces 32 and 34 of the fastener body and thence through the threaded fastener to the member 50, and a force S', which is the direct opposite of shear force S, indicated by the opposite arrow, would be resisted by the entire force on the undersurface of the fastener body and would be transmitted then to the bored portion 46 and through the threaded fastener to the member 50.

The other stresses that may be put upon this fastener body would be generally in tension, as previously explained, such that the wooden members are securely held in tension with the tensional forces distributed laterally because of the varying taper of the sides 14 of the mortise 12.

Accordingly, there is little danger of pulling the tenon-type fastener out of its mortise because of the substantial stress required to compress or shear the wood in the direction of the edge 11 under these conditions. For these reasons, the fastener of this invention provides an improved manner of fastening wooden members together which substantially resists forces tending to separate the joined members, whether they be in shear, or in tension, or a combination of these.

It is not my intention that the illustrated embodiment or the terminology employed in describing it be limiting inasmuch as variations of these may be made without departing from the spirit of the invention. Rather, I desire to be restricted only by the scope of the appended claim.

The invention claimed is:

A fastener for engagement with a dovetailed inwardly flaring mortise in the end of a wooden member, said fastener comprising a body of generally trapezoidal transverse cross section having two opposed substantially parallel planar faces, opposed end surfaces, and opposed side surfaces, one of said parallel planar faces and one of said end surfaces being larger than the other, said side surfaces sloping from the larger planar face to the smaller and from the larger end face to the smaller, a central bore extending through said end surfaces, for receiving a headed threaded fastener.

References Cited by the Examiner

UNITED STATES PATENTS

| | | | |
|---|---|---|---|
| 571,042 | 11/1896 | Edquist | 20—92.5 |
| 625,948 | 5/1899 | Bickel | 287—114 |
| 1,006,974 | 10/1911 | Moore et al. | 254—104 |
| 1,761,339 | 6/1930 | Hauser | 292—342 |

FRANK L. ABBOTT, *Primary Examiner.*

R. A. STENZEL, *Assistant Examiner.*